United States Patent [19]

Grund et al.

[11] Patent Number: 4,465,628
[45] Date of Patent: Aug. 14, 1984

[54] AZO DYES COMPRISING A HETEROCYCLIC DIAZO COMPONENT

[75] Inventors: Norbert Grund; Guenter Hansen, both of Ludwigshafen; Wolf-Dieter Kermer, Fussgoenheim, all of Fed. Rep. of Germany

[73] Assignee: BASF Aktiengesellschaft, Ludwigshafen, Fed. Rep. of Germany

[21] Appl. No.: 92,182

[22] Filed: Nov. 7, 1979

[30] Foreign Application Priority Data

Nov. 15, 1979 [DE] Fed. Rep. of Germany ....... 2849471

[51] Int. Cl.³ .................. C09B 29/039; C09B 29/045; C09B 29/08; D06P 3/54
[52] U.S. Cl. .................................................. 260/158
[58] Field of Search ......................................... 260/158

[56] References Cited

U.S. PATENT DOCUMENTS

| | | | |
|---|---|---|---|
| 3,405,118 | 10/1968 | Sartori | 260/158 |
| 3,455,898 | 7/1969 | Seefelder et al. | 260/158 |
| 3,478,011 | 11/1969 | Artz | 260/158 X |
| 3,658,784 | 4/1972 | Lange | 260/158 |
| 3,919,188 | 11/1975 | Hagen et al. | 260/158 |
| 3,985,726 | 10/1976 | Artz | 260/162 |
| 4,002,604 | 1/1977 | Fawkes et al. | 260/155 |
| 4,062,642 | 12/1977 | Deucker et al. | 260/158 X |
| 4,111,930 | 9/1978 | Meybeck | 260/158 X |

FOREIGN PATENT DOCUMENTS

| | | | |
|---|---|---|---|
| 2644169 | 2/1971 | Fed. Rep. of Germany | 260/158 |
| 2222639 | 11/1972 | Fed. Rep. of Germany | 260/158 |
| 2601603 | 7/1977 | Fed. Rep. of Germany | 260/158 |
| 1313371 | 4/1973 | United Kingdom | 260/158 |

*Primary Examiner*—Floyd D. Higel
*Attorney, Agent, or Firm*—Oblon, Fisher, Spivak, McClelland & Maier

[57] ABSTRACT

An azo dye comprising a heterocyclic diazo component, of the general formula

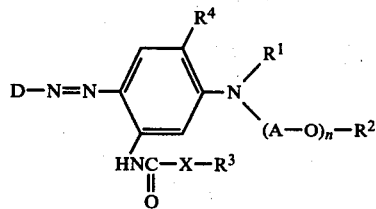

where
D is a radical of the formula

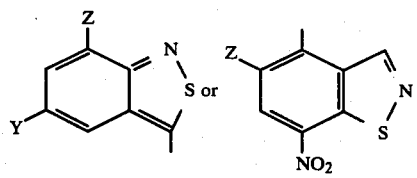

Y is nitro, chlorine or bromine,
Z is hydrogen, chlorine, bromine, cyano or nitro,
$R^1$ is $C_1$–$C_4$-alkyl which is unsubstituted or substituted by hydroxyl, $C_1$–$C_4$-alkoxy, cyano, $C_1$–$C_4$-alkanoyloxy, $C_1$–$C_4$-alkoxycarbonyl, $C_1$–$C_4$-alkanoylamino, $C_1$–$C_4$-alkylaminocarbonyloxy, $C_1$–$C_4$-alkoxycarbonyloxy, chlorine, phenyl and/or phenoxy, or is cyclohexyl, propargyl or $C_3$–$C_5$-alkenyl, or is a radical of the formula $(A-O)_n$-$R^2$, $R^2$ is $C_1$–$C_4$-alkyl, phenyl or, if $n>1$, may also be hydrogen,
$R^3$ is $C_1$–$C_8$-alkyl, which may be substituted by phenyl or phenoxy,
$R^4$ is hydrogen, methyl, ethyl, methoxy, ethoxy or phenoxy,
X is oxygen or a direct bond,
A is —$CH_2CH_2$—, —$CH_2CH_2CH_2$—, $$CH_3\underset{|}{CH}-CH_2- \text{ or } C_2H_5\underset{|}{CH}-CH_2-$$

and
n is 1, 2 or 3.

The dyes of the formula I are very suitable for dyeing synthetic textile materials, especially polyesters.

5 Claims, No Drawings

AZO DYES COMPRISING A HETEROCYCLIC DIAZO COMPONENT

SUMMARY OF THE INVENTION

The present invention provides novel dyes of the formula I

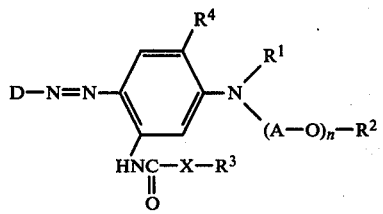

where
D is a radical of the formula

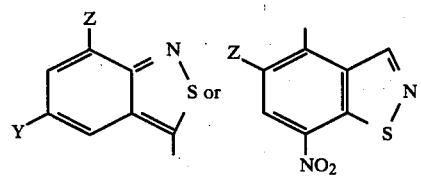

Y is nitro, chlorine or bromine,
Z is hydrogen, chlorine, bromine, cyano or nitro,
$R^1$ is $C_1-C_4$-alkyl which is unsubstituted or substituted by hydroxyl, $C_1-C_4$-alkoxy, cyano, $C_1-C_4$-alkanoyloxy, $C_1-C_4$-alkoxycarbonyl, $C_1-C_4$-alkanoylamino, $C_1-C_4$-alkylaminocarbonyloxy, $C_1-C_4$-alkoxycarbonyloxy, chlorine, phenyl and/or phenoxy, or is cyclohexyl, propargyl or $C_3-C_5$-alkenyl, or is a radical of the formula $(A-O)_n-R^2$, $R^2$ is $C_1-C_4$-alkyl, phenyl or, if n>1, may also be hydrogen,
$R^3$ is $C_1-C_8$-alkyl, which may be substituted by phenyl or phenoxy,
$R^4$ is hydrogen, methyl, ethyl, methoxy, ethoxy or phenoxy,

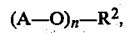

and
n is 1, 2 or 3.
The dyes of the formula I are in particular very suitable for dyeing synthetic polyesters.

DESCRIPTION OF THE PREFERRED EMBODIMENTS

The present invention relates to dyes of the formula I

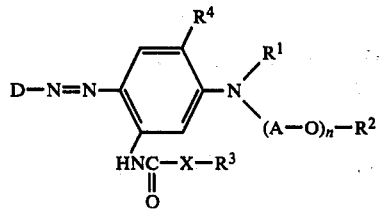

where
D is a radical of the formula

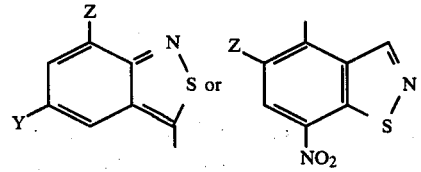

Y is nitro, chlorine or bromine,
Z is hydrogen, chlorine, bromine, cyano or nitro,
$R^1$ is $C_1-C_4$-alkyl which is unsubstituted or substituted by hydroxyl, $C_1-C_4$-alkoxy, cyano, $C_1-C_4$-alkanoyloxy, $C_1-C_4$-alkoxycarbonyl, $C_1-C_4$-alkanoylamino, $C_1-C_4$-alkylaminocarbonyloxy, $C_1-C_4$-alkoxycarbonyloxy, chlorine, phenyl and/or phenoxy, or is cyclohexyl, propargyl or $C_3-C_5$-alkenyl, or is a radical of the formula $(A-O)_n-R^2$, $R^2$ is $C_1-C_4$-alkyl, phenyl or, if n>1, may also be hydrogen,
$R^3$ is $C_1-C_8$-alkyl, which may be substituted by phenyl or phenoxy,
$R^4$ is hydrogen, methyl, ethyl, methoxy, ethoxy or phenoxy,
X is oxygen or a direct bond,
A is $-CH_2CH_2-$, $-CH_2CH_2CH_2-$,

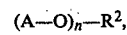

and
n is 1, 2 or 3.
Examples of radicals $R^1$, in addition to those already mentioned specifically, are:

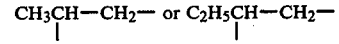

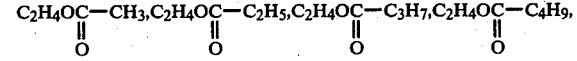

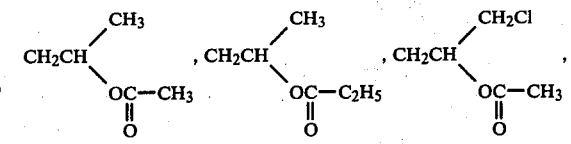

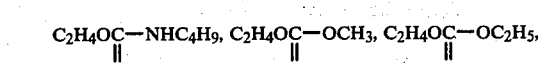

-continued

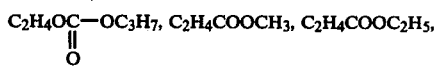

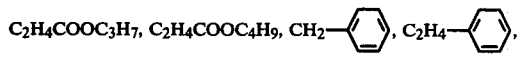

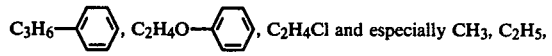

Radicals $R^2$, in addition to those already mentioned specifically, are $CH_3$, $C_2H_5$, $C_3H_7$ and $C_4H_9$.

Examples of radicals $R^3$ are

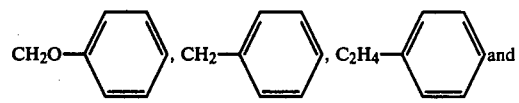

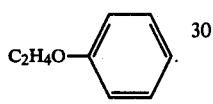

A dye of the formula I may be prepared by reacting a diazonium compound of an amine of the formula II $$D-NH_2 \qquad II$$

with a coupling component of the formula III

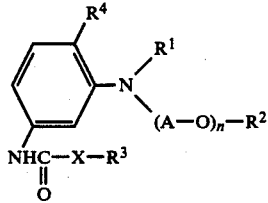

The diazotization and coupling exhibit no special features compared to conventional methods.

A compound of the formula III may be obtained from a compound of the formula IV

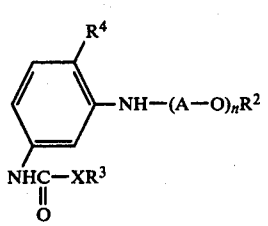

by introducing the radical $R^1$ by conventional methods.

The reactions may be carried out either without a solvent, in a melt, or in an organic solvent, such as dimethylformamide or N-methylpyrrolidone, in the presence or absence of an acid-binding agent, for example potassium carbonate.

A compound of the formula IV may advantageously be prepared by reacting an aniline derivative of the formula

with a compound of the formula $$(T-(A-O)_nR^2$$

where T is a radical which can be detached as an anion.

Since this reaction, as well as the introduction of the radical $R^1$, as a rule does not take place quantitatively, a mixture of compounds is obtained, but such mixtures are particularly suitable for use as the coupling component.

Dyes of particular industrial importance are those of the formula Ia

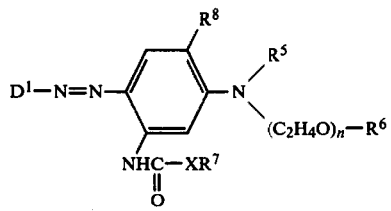

where $D^1$ is 5-nitro-2,1-benzisothiazolyl, 5-nitro-7-bromo-2,1-benzisothiazolyl, 5-nitro-7-chloro-2,1-benzisothiazolyl, 7-nitro-1,2-benzisothiazolyl, 5-bromo-7-nitro-1,2-benzisothiazolyl or 5-cyano-7-nitro-1,2-benzisothiazolyl, $R^5$ is $C_1$–$C_4$-alkyl, allyl, β-hydroxyethyl, β-hydroxypropyl, β-$C_1$–$C_4$-alkanoyloxyethyl, β-$C_1$–$C_4$-alkanoyloxypropyl, $C_1$–$C_4$-alkoxycarbonylethyl, benzyl, phenylethyl, phenoxyethyl or a radical of the formula $$(C_2H_4O)_n-R^6,$$

$R^6$ is $C_1$–$C_4$-alkyl or phenyl,
$R^7$ is $C_1$–$C_4$-alkyl,

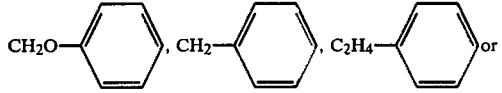

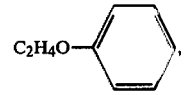

$R^8$ is hydrogen, methoxy or ethoxy,
X is oxygen or, preferably, a direct bond and
n is 1 or 2.

The dyes of the formula I may be used for dyeing synthetic fibers, for example cellulose acetates, nylons and especially polyesters. Deep violet to bluish green dyeings having good lightfastness wetfastness and fastness to thermofixing are obtained.

Some of the dyes may also be used for the process described in German Pat. No. 1,811,796.

Compounds particularly preferred for dyeing polyesters are those of the general formula Ib

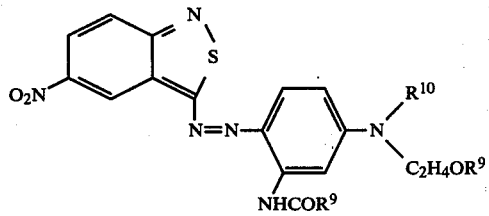

Ib where $R^9$ is $C_1-C_4$-alkyl and $R^{10}$ is $C_1-C_4$-alkyl, allyl or $C_2H_4OR^9$.

In the Examples which follow, parts and percentages are by weight, unless stated otherwise.

EXAMPLE 1

9.8 parts of 3-amino-5-nitro-2,1-benzisothiazole are introduced into 50 parts of 85% strength sulfuric acid at from 10° to 15° C. 16 parts of 45% strength nitrosylsulfuric acid are added dropwise, at 0°–5° C., to the solution obtained. The resulting diazonium salt solution is then stirred for 3 hours at 0°–5° C., after which it is added to a solution of 12.5 parts of N-ethyl-N-ethoxyethyl-m-aminoacetanilide, 20 parts of dimethylformamide, 30 parts of concentrated hydrochloric acid, 250 parts of water and 250 parts of ice. The pH is brought to 1.2 L by adding sodium acetate. After completion of coupling, the dye which has precipitated is filtered off, washed neutral with water and dried under reduced pressure at 70° C. 17 parts of the dye of the formula

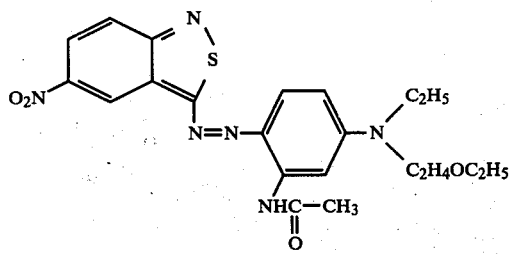

are obtained. On polyester fibers, this dye gives very fast intense greenish blue dyeings.

A finely divided dye formulation which can easily be stirred into an aqueous dyeing liquor may be obtained, for example, as follows:

The dye (which may have been dried, or is in the form of a moist press cake) is milled in the presence of a dispersant at from 40° to 110° C., preferably at from 60° to 90° C. A pretreatment is also advantageous, for example heating the dye in aqueous suspension or as a moist paste, in the presence or absence of a dispersant and/or organic solvent, at from 50° to 120° C.

The coupling component employed to synthesize the dye may, for example, be prepared as follows:

20.6 parts of potassium carbonate, 1 part of potassium iodide and 21.6 parts of 2-ethoxyethyl chloride are added to a solution of 30 parts of m-aminoacetanilide in 100 parts of dimethylformamide, the mixture is then refluxed for 24 hours, a further 20.6 parts of potassium carbonate and 10.8 parts of 2-ethoxyethyl chloride are added and the mixture is refluxed for a further 8 hours. 50 parts of dimethylformamide and 60 parts of potassium carbonate are then added, 96 parts of ethyl bromide are slowly introduced dropwise at 100° C., and the batch is then refluxed for 16 hours. Excess ethyl bromide and 2-ethoxyethyl chloride are distilled off. Undissolved inorganic salts are then filtered off and the filtrate is stirred into 500 parts of water. An oil separates out and is taken up in ethyl acetate. The organic phase is washed neutral and dried over sodium sulfate. After distilling off the solvent, 40 parts of an oil are obtained; this is used, without further purification, for the synthesis of the dye.

EXAMPLE 2

9.8 parts of 3-amino-5-nitro-2,1-benzisothiazole are introduced into 50 parts of 85% strength sulfuric acid at 10°–15° C. 16 parts of 45% strength nitrosylsulfuric acid are added dropwise at 0°–5° C. and the diazonium salt solution is then stirred for 3 hours at 0°–5° C., after which it is added dropwise, at the same temperature, to a solution of 11.8 parts of N-ethyl-N-methoxyethyl-m-aminoacetanilide, 20 parts of dimethylformamide, 30 parts of concentrated hydrochloric acid, 250 parts of water and 250 parts of ice. After completion of coupling, the dye which has precipitated is filtered off, washed neutral with water and dried under reduced pressure at 50° C. 16.2 parts of the dye of the formula

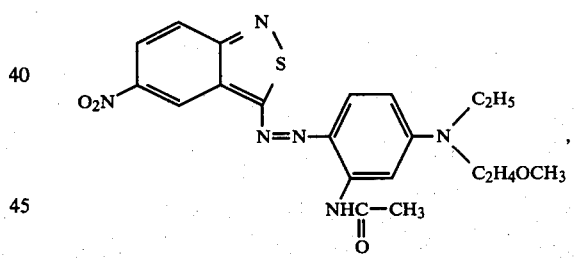

are obtained. On polyester fibers, the product gives very fast intensely greenish blue dyeings.

EXAMPLE 3

9.8 parts of 3-amino-5-nitro-2,1-benzisothiazole are introduced into 50 parts of 85% strength sulfuric acid at 10°–15° C. 16 parts of 45% strength nitrosylsulfuric acid are added dropwise at 0°–5° C. and the diazonium salt solution is stirred for 3 hours at this temperature and is then run, at 0°–5° C., into a solution of 13.2 parts of N-ethyl-N-ethoxyethyl-m-aminopropionylanilide in 25 parts of dimethylformamide, 35 parts of concentrated hydrochloric acid, 250 parts of water and 250 parts of ice. After completion of coupling, the dye which has precipitated is filtered off, washed neutral with water and dried under reduced pressure at 60° C. 17.4 parts of the dye of the formula

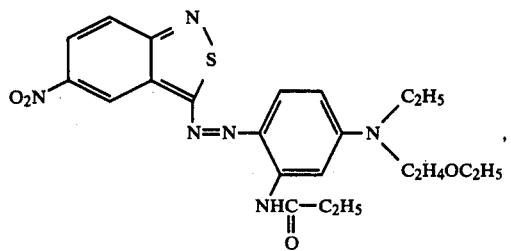

are obtained. On polyester fibers, the product gives very fast greenish blue dyeings.

The dyes which are characterized by their substituents in the Table which follows, and in which A is in each case $C_2H_4$, are obtained by a similar method.

| Example | D—NH₂ | R¹ | R² | R³ | R⁴ | X | n | Hue |
|---|---|---|---|---|---|---|---|---|
| 4 | [O₂N-benzisothiazole-NH₂] | $C_2H_5$ | $CH_3$ | $C_2H_5$ | H | — | 1 | greenish blue |
| 5 | " | " | $C_2H_5$ | $CH_3$ | $OCH_3$ | — | 1 | bluish green |
| 6 | " | " | " | $C_2H_5$ | " | — | 1 | " |
| 7 | " | $CH_2$—CH—$CH_2$ | " | $CH_3$ | H | — | 1 | greenish blue |
| 8 | " | $C_4H_9$ | " | " | H | — | 1 | " |
| 9 | " | $C_2H_5$ | " | " | H | — | 2 | " |
| 10 | " | $CH_3$ | $CH_3$ | $C_2H_5$ | H | — | 1 | " |
| 11 | " | $C_2H_5$ | $C_2H_5$ | " | H | O | 1 | " |
| 12 | " | $C_2H_4CN$ | " | " | H | — | 1 | blue |
| 13 | " | $C_2H_4OC_2H_5$ | " | $CH_3$ | H | — | 1 | " |
| 14 | " | $CH_2$—phenyl | " | " | H | — | 1 | " |
| 15 | " | $C_2H_4COOCH_3$ | " | " | H | — | 1 | " |
| 16 | " | $C_2H_5$ | $CH_3$ | —CHC$_4$H$_9$ \| $C_2H_5$ | H | — | 1 | greenish blue |
| 17 | " | " | " | $C_3H_7(n)$ | H | — | 1 | " |
| 18 | " | " | " | $CH_3$ | $OC_2H_5$ | — | 1 | bluish green |
| 19 | " | " | " | $C_4H_9$ | H | — | 1 | greenish blue |
| 20 | " | " | " | $C_2H_5$ | $CH_3$ | H | O | 1 | " |
| 21 | [Cl, O₂N-benzisothiazole-NH₂] | " | " | " | H | — | 1 | bluish green |
| 22 | " | $CH_2$—CH—$CH_2$ | " | $C_2H_5$ | H | — | 1 | " |
| 23 | " | $C_3H_7(n)$ | " | $CH_2$—phenyl | H | — | 1 | " |
| 24 | [Br, O₂N-benzisothiazole-NH₂] | $C_2H_5$ | " | $C_4H_9$ | H | — | 1 | " |

-continued

| Example | D—NH$_2$ | R$^1$ | R$^2$ | R$^3$ | R$^4$ | X | n | Hue |
|---|---|---|---|---|---|---|---|---|
| 25 | " | CH$_2$–C$_6$H$_5$ | " | CH$_3$ | H | — | 1 | " |
| 26 | 4-amino-7-nitrobenzisothiazole | C$_2$H$_5$ | " | " | H | — | 1 | " |
| 27 | " | C$_2$H$_4$OC$_2$H$_5$ | " | " | H | — | 1 | bluish violet |
| 28 | " | CH$_2$–C$_6$H$_5$ | " | " | H | — | 1 | " |
| 29 | 4-amino-5-bromo-7-nitrobenzisothiazole | C$_2$H$_5$ | " | " | H | — | 1 | blue |
| 30 | " | C$_2$H$_4$OC$_2$H$_5$ | " | C$_2$H$_5$ | H | — | 1 | " |
| 31 | " | C$_2$H$_5$ | " | CH$_2$–O–C$_6$H$_5$ | H | — | 1 | " |
| 32 | " | " | " | CH$_2$–C$_6$H$_5$ | H | — | 1 | " |
| 33 | 4-amino-5-cyano-7-nitrobenzisothiazole | " | " | CH$_3$ | H | — | 1 | greenish blue |
| 34 | " | C$_4$H$_9$ | CH$_3$ | C$_2$H$_5$ | H | — | 1 | " |
| 35 | " | CH$_2$–CH=CH$_2$ | C$_2$H$_5$ | CH$_3$ | H | — | 1 | " |
| 36 | " | C$_2$H$_5$ | " | C$_2$H$_5$ | OCH$_3$ | — | 1 | bluish green |

We claim:
1. A dye of the formula

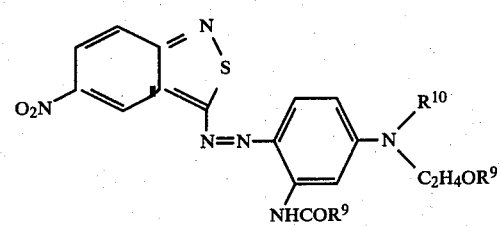

where R$^9$ is C$_1$–C$_4$-alkyl and R$^{10}$ is C$_1$–C$_4$-alkyl, allyl or C$_2$H$_4$OR$^9$.

2. The dye of claim 1 which is

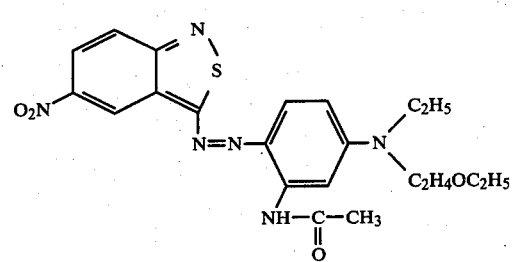

3. The dye of claim 1 which is

4. The dye of claim 1 which is
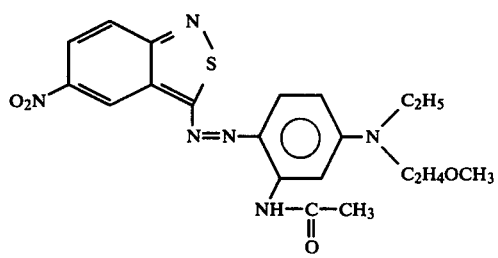
5. The dye of claim 1 which is
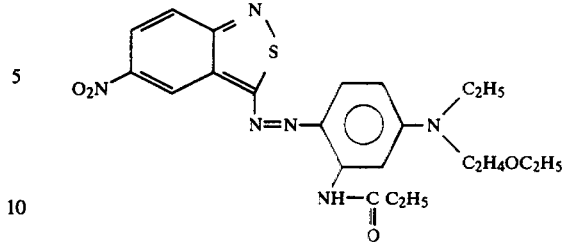
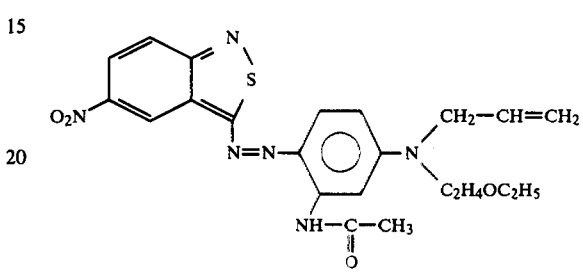
* * * * *

UNITED STATES PATENT AND TRADEMARK OFFICE
CERTIFICATE OF CORRECTION

PATENT NO. : 4,465,628

DATED : August 14, 1984

INVENTOR(S) : GRUND et al.

It is certified that error appears in the above-identified patent and that said Letters Patent is hereby corrected as shown below:

On the title page:
- - [30] Foreign Application Priority Data
    Nov. 15, 1978 [DE] Fed. Rep. of Germany ... 2849471 - -

Signed and Sealed this

Thirtieth Day of October 1984

[SEAL]

Attest:

GERALD J. MOSSINGHOFF

Attesting Officer

Commissioner of Patents and Trademarks